United States Patent [19]
Ueda et al.

[11] Patent Number: 5,832,401
[45] Date of Patent: Nov. 3, 1998

[54] ELECTRONIC CONTROL SYSTEM FOR AUTOMOTIVE VEHICLE

[75] Inventors: Yoshiaki Ueda; Yoshihisa Sugimoto, both of Fuji, Japan

[73] Assignee: Jatco Corporation, Fuji, Japan

[21] Appl. No.: 637,392

[22] Filed: Apr. 25, 1996

[30] Foreign Application Priority Data

Apr. 27, 1995 [JP] Japan .................................. 7-104096

[51] Int. Cl.$^6$ .................................................. F02D 25/00
[52] U.S. Cl. ................................................ 701/55; 701/54
[58] Field of Search .................................. 701/53, 54, 55, 701/56, 36, 48; 477/101, 107, 109, 110, 111, 116

[56] References Cited

U.S. PATENT DOCUMENTS

| | | | |
|---|---|---|---|
| 4,703,428 | 10/1987 | Hosaka et al. | 364/424.1 |
| 4,945,481 | 7/1990 | Iwatsuki et al. | 364/424.1 |
| 5,126,940 | 6/1992 | Haubner | 364/424.1 |
| 5,189,617 | 2/1993 | Shiraishi | 364/424.05 |
| 5,369,581 | 11/1994 | Ohsuga et al. | 364/424.01 |
| 5,547,434 | 8/1996 | Graf et al. | 477/109 |
| 5,609,545 | 3/1997 | Sola et al. | 477/78 |

FOREIGN PATENT DOCUMENTS

| | | |
|---|---|---|
| 2077425 | 3/1993 | Canada . |
| 0 532 363 | 3/1993 | European Pat. Off. . |
| 0 554 465 | 3/1993 | European Pat. Off. . |
| WO 95/05951 | 3/1995 | WIPO . |

*Primary Examiner*—Michael Zanelli
*Attorney, Agent, or Firm*—Foley & Lardner

[57] ABSTRACT

An electronic control system for an automotive vehicle includes communication portion provided between first and second control units and, specification information presenting portion arranged at the side of the first control unit for presenting specification information of the second control unit to the second control unit via the communication portion, specification information analyzing portion arranged at the side of the second control unit for analyzing the specification information, and control content setting portion arranged at the side of the second control unit for setting content of control depending upon the specification information on the basis of a result of analysis by the specification information analyzing portion. From the first control unit to the second control unit, the content of control of the second control unit is set depending upon the specification information by presenting the second control unit via the communication portion.

8 Claims, 9 Drawing Sheets

ELECTRONIC CONTROL SYSTEM FOR AUTOMOTIVE VEHICLE

BACKGROUND OF THE INVENTION

1. Field of the Invention

The present invention relates to an electronic control system for an automotive vehicle which has at least two, first and second control units for controlling mutually distinct control objects.

2. Description of the Related Art

Conventionally, an integrated control unit for an engine and an automatic transmission, for example has been known as this type of an automotive electronic control system. In such integrated control unit, a communication system is provided between a control unit for the automatic transmission and a control unit for the engine so as to transmit a shift timing information from the former control unit to the latter control unit for temporarily lowering an output torque of the engine for reducing shift shock upon shifting of transmission speed ratio of the automatic transmission.

In the conventional automotive electronic control system, when a plurality of kinds of the control units for the engine are combined with one kind of the control unit for the automatic transmission, the engine control units adapted to engine control parameters, such as displacement, have to be tuned for reduction of the shift shock in cooperation of the control unit for the automatic transmission depending upon specification information. Therefore, setting of parts of the control unit for the automatic transmission depending upon the specification information of the control units of the engines has to be differentiated. For example, a plurality of kinds of storage device (ROMs) storing information corresponding to specification informations of the control units for the engine are manufactured and selectively assembled as the storage device employed in the control unit for the automatic transmission, a low cost for preparation of masks cannot be expected for small amount of ROMs. Furthermore, in viewpoint of management of parts for the electronic control circuit, a distinct parts number has to be assigned for respective kinds of ROMs to cause load in management to results in rising of cost.

On the other hand, as disclosed in Japanese Patent Application Laid-open No. 264306/1987, a selection switch is provided in the control unit for the automatic transmission for inputting specification information by the switch, device therefor has to be set to cause increasing of weight, increasing of size and rising of cost of the overall system.

SUMMARY OF THE INVENTION

Therefore, it is an object of the present invention to provide an electronic control system for an automotive vehicle which can easily set a content of control of one control unit depending upon specification information provided from the other control unit mutually between at least two control units by utilizing a communication means.

In order to accomplish the above-mentioned object, an electronic control system for an automotive vehicle, according to the present invention, comprises:

communication means provided between first and second control units;

specification information presenting means arranged at the side of the first control unit for presenting specification information of the second control unit to the second control unit via the communication means;

specification information analyzing means arranged at the side of the second control unit for analyzing the specification information; and control content setting means arranged at the side of the second control unit for setting content of control depending upon the specification information on the basis of a result of analysis by the specification information analyzing means.

In the electronic control system for an automotive vehicle, from the first control unit to the second control unit, the content of control of the second control unit is set depending upon the specification information by presenting the second control unit via the communication portion.

In the electronic control system, the first control unit may be an electronic control system for controlling an engine, information presenting means presents at least one of kind the vehicle, destination information or kind information of the engine, and the second control unit is an automatic transmission control unit for controlling an automatic transmission. By this, integrated control configuration of the engine control unit and the automatic transmission control unit is optimally set.

In an electronic control system for an automotive vehicle according to the present invention, the specification information presenting means may present specification information for a given period after initiation of operation of the first and second control units, and the specification information analyzing means may have a storage portion for storing specification information presented by the specification information presenting means. By this, transmission period of the specification information from the first control unit can be limited to minimum necessary period. Also, the storage portion can be integrated as ROM common to the second control unit. As a result, by mass-production of ROM, cost down can be achieved.

The electronic control system for an automotive vehicle according to the present invention, the first and second control units are so constructed that a plurality of first control units may be combined with a single second control unit. By this, the content of control of the second control unit can be easily set with respect to respective kinds of the first control units.

The communication means may determine a communication timing between the first and second control means with reference to a timing, at which an ignition switch of the automotive vehicle is turned ON.

The second control means may have means for transmitting a communication termination signal to the first control means via the communication means when reading of the specification information presented from the first control means via the communication means is completed, and the first control means may wait for the communication termination signal from the second control means for controlling a control object of the first control means.

Also, the second control means may be an automatic transmission control unit for controlling an automatic transmission, the control content setting means may set at least one of shift pattern of the automatic transmission or control constant of a line pressure upon shifting depending upon the specification information presented via the communication means. Furthermore, the specification information presenting means may present the specification information to the second control means via the communication means for a given period after starting up of the engine of the automotive vehicle.

In addition, the communication means may have an analog signal line. In the alternative, the communication means may have a digital signal line.

BRIEF DESCRIPTION OF THE DRAWINGS

The present invention will be understood more fully from the detailed description given herebelow and from the accompanying drawings of the preferred embodiment of the invention, which, however, should not be taken to be limitative to the present invention, but are for explanation and understanding only.

In the drawings.

DESCRIPTION OF THE PREFERRED EMBODIMENT

The preferred embodiments of electronic control system according to the present invention will be discussed with reference to the accompanying drawings. In the following description, numerous specific details are set forth in order to provide a thorough understanding of the present invention. It will be obvious, however, to those skilled in the art that the present invention may be practiced without these specific details. In other instance, well-known structures are not shown in detail for clarity.

(First Embodiment)

FIGS. 1 to 5 are drawings for discussing the first embodiment of an electronic control system according to the present invention.

Figure 1:
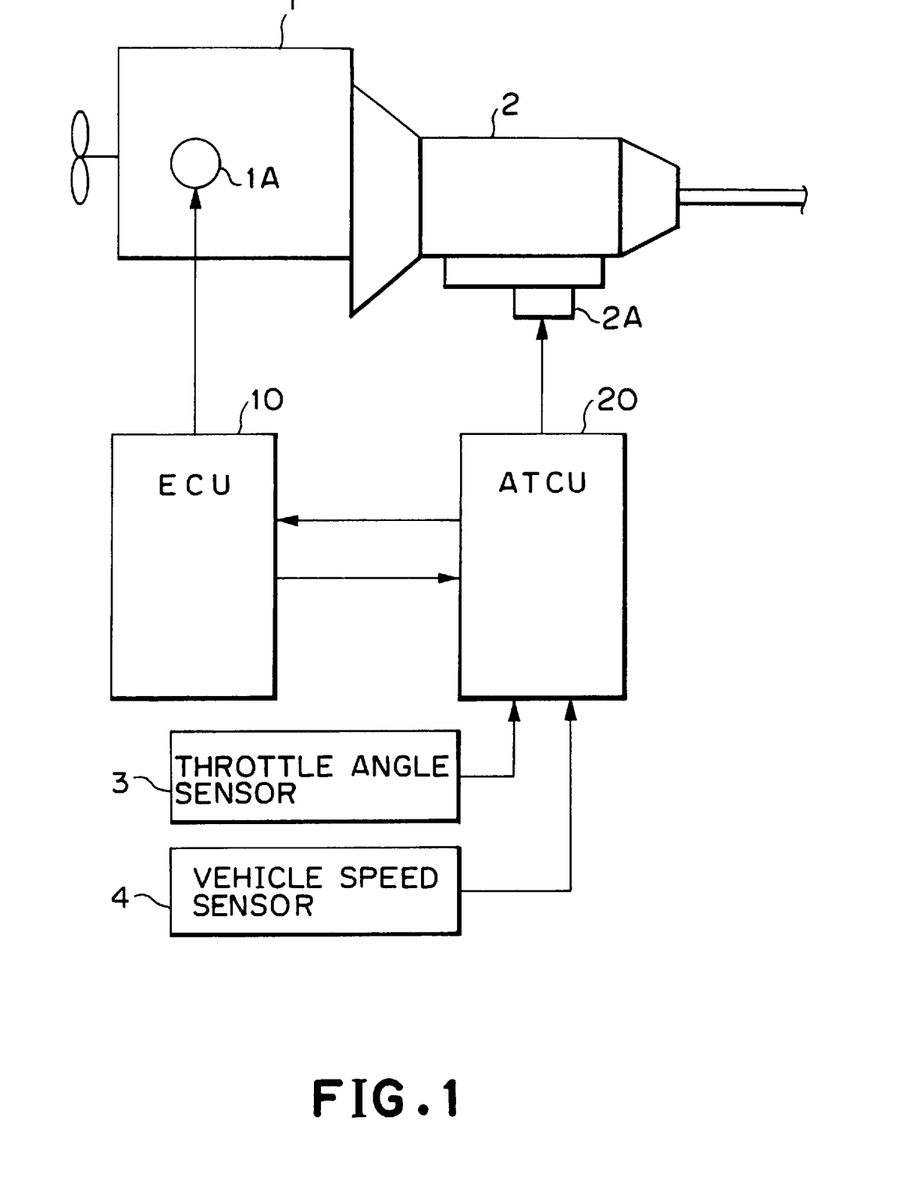
FIG. 1 is a schematic diagram showing the overall construction of the first embodiment of an electronic control system for an automotive vehicle, according to the present invention.

As shown in FIG. 1, the shown embodiment of the automotive electronic control system is constructed with an electronic control unit (hereinafter referred to as "ECU") 10 for an automotive engine 1 and an automatic transmission control unit (hereinafter referred to as "ATCU") 20 for an automatic transmission 2. The ECU 10 has a control function of a spark ignition timing and outputs a spark ignition timing control signal to a power transistor unit 1A of the engine 1 on the basis of detection signals from various sensors. The ATCU 20 provides a shift control function of determining a optical transmission speed ratio depending upon a vehicular traveling condition and a vehicle condition on the basis of detecting signals of a throttle angle sensor 3 and a vehicle speed sensor 4, predetermined shift pattern and so forth, and outputting a shift control signal to a shift solenoid 2A.

Furthermore, the ECU 10 and the ATCU 20 reduces shift shock by integrated control. Namely, the ATCU 20 outputs a torque down demand signal to the ECU 10 upon shifting, at which shift shock can be caused. The ECU 10 is responsive to the torque down demand signal to output a torque down permitting response signal for lower an output torque of the engine 1. Communication between the ECU 10 and the ATCU 20 is established by a communication means, such as a communication cable and so forth.

The construction set forth above is a conventionally well known general construction.

In the shown embodiment, utilizing the existing communication means established between the ECU 10 and the ATCU 20, specification information which will be discussed later, is transmitted from the ECU 10 to the ATCU 20. The content of control of the ATCU is set on the basis of the specification information.

Figure 2:
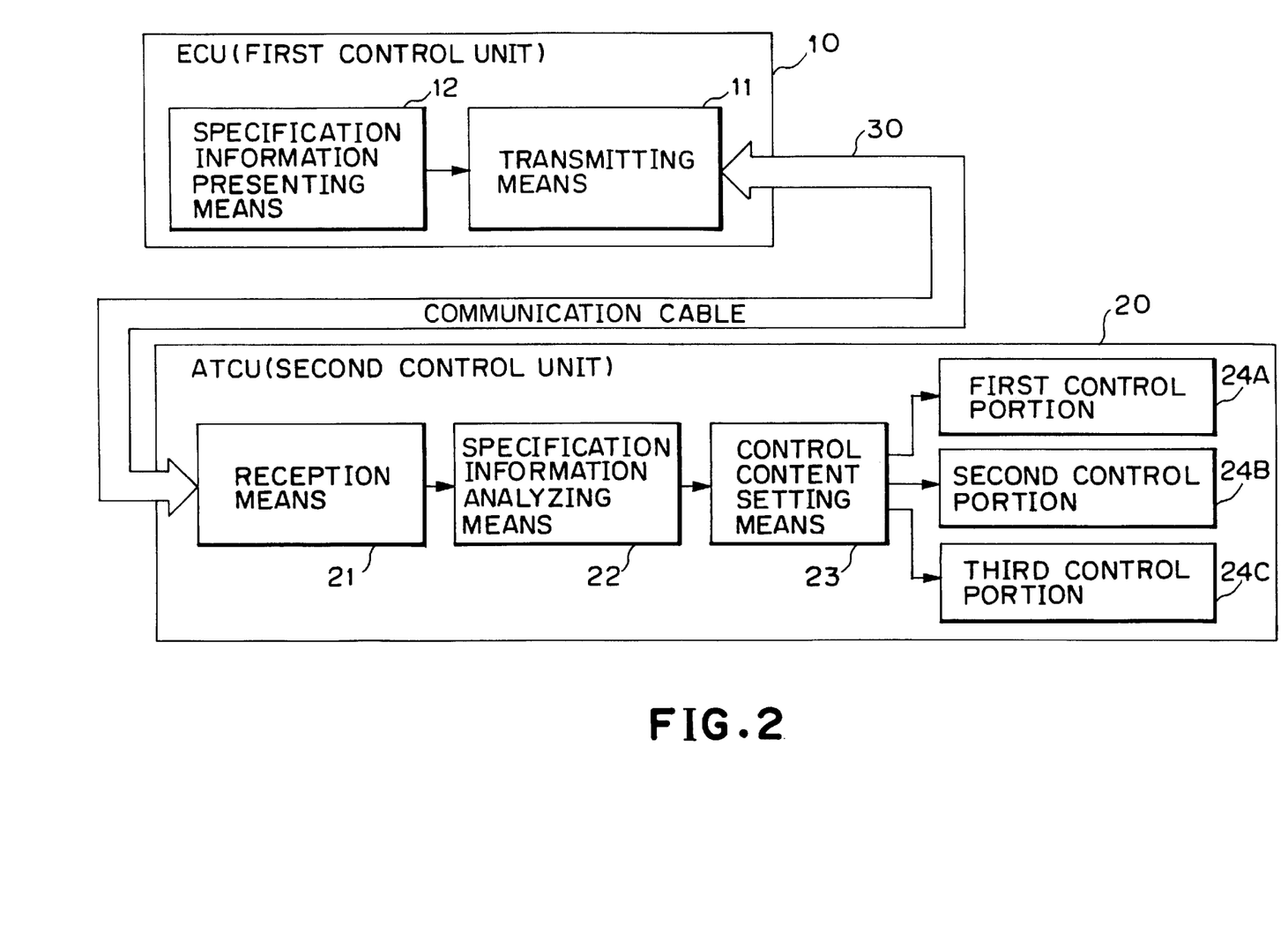
FIG. 2 is a block diagram showing the major parts of a control unit for an engine and a control unit for an automatic transmission shown in FIG. 1.

FIG. 2 is a block diagram showing the major parts of the ECU 10 and the ATCU 20. A transmission means 11 of the ECU 10, a reception means 21 of the ATCU 20 and a communication cable 30 construct a part of the existing communication means.

In the ECU 10, a specification information presenting means 12 is provided. In the specification information presenting means 12, specification information, such as a kind of a vehicle on which the ECU 10 is mounted, a destination for shipping, displacement of the engine 1 and so forth is stored. These specification information is transmitted from the transmission means 11 to the reception means 21 of the ATCU 20 through a communication cable 30 according to a predetermined communication protocol.

The specification information received by the reception means 21 is analyzed by a specification information analyzing means 22. On the basis of the result of analysis, a control content setting means 23 selects any one of control portion 24A, 24B and 24C. The control portion 24A, 24B and 24C are sets of control logic and control data. By selecting one of these, the content of control of the ATCU 20 is selectively set. The content of control will be discussed together with the operation.

When the content of integrated control is simple, the communication means between the ECU 10 and the ATCU 20 may establish communication by identifying the specification information with level of an analog signal even with a single communication line, by matching communication timing at the ECU 10 side and the ATCU 20 side at a timing immediately after the ignition key turned on. As such simple communication means, it is not necessary to employ an expensive IC device dedicated for communication.

Next, discussion will be given for operation.

Figure 3:
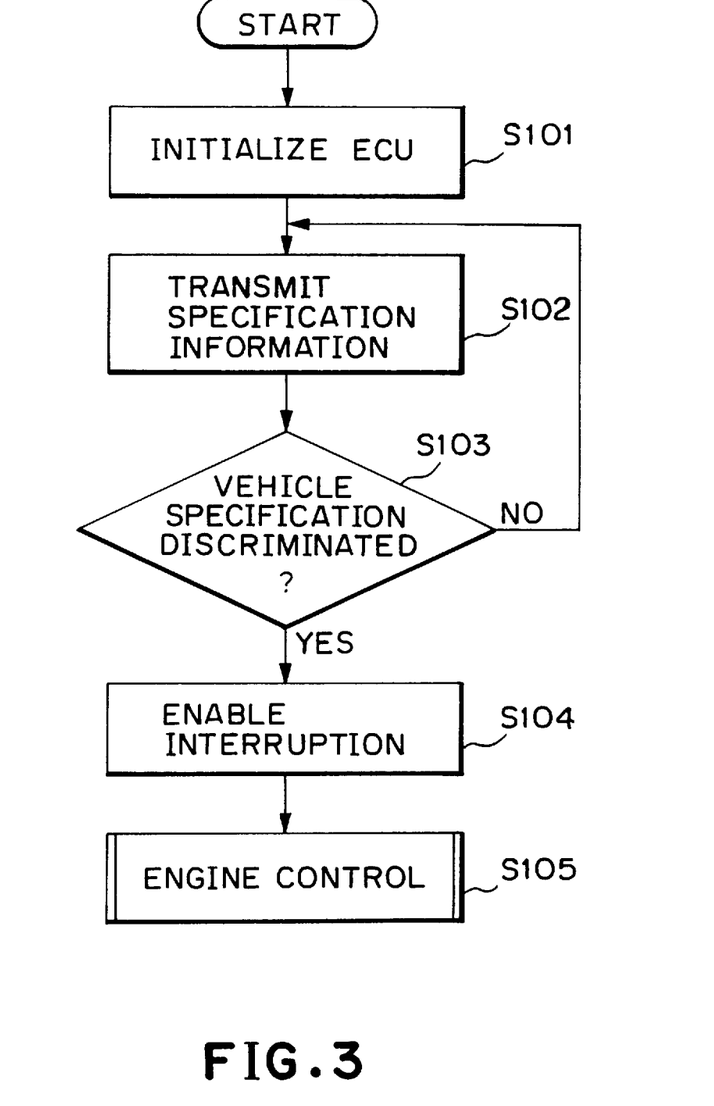
FIG. 3 is a flowchart for explaining operation of the control unit for the engine shown in FIG. 2.
Figure 4:
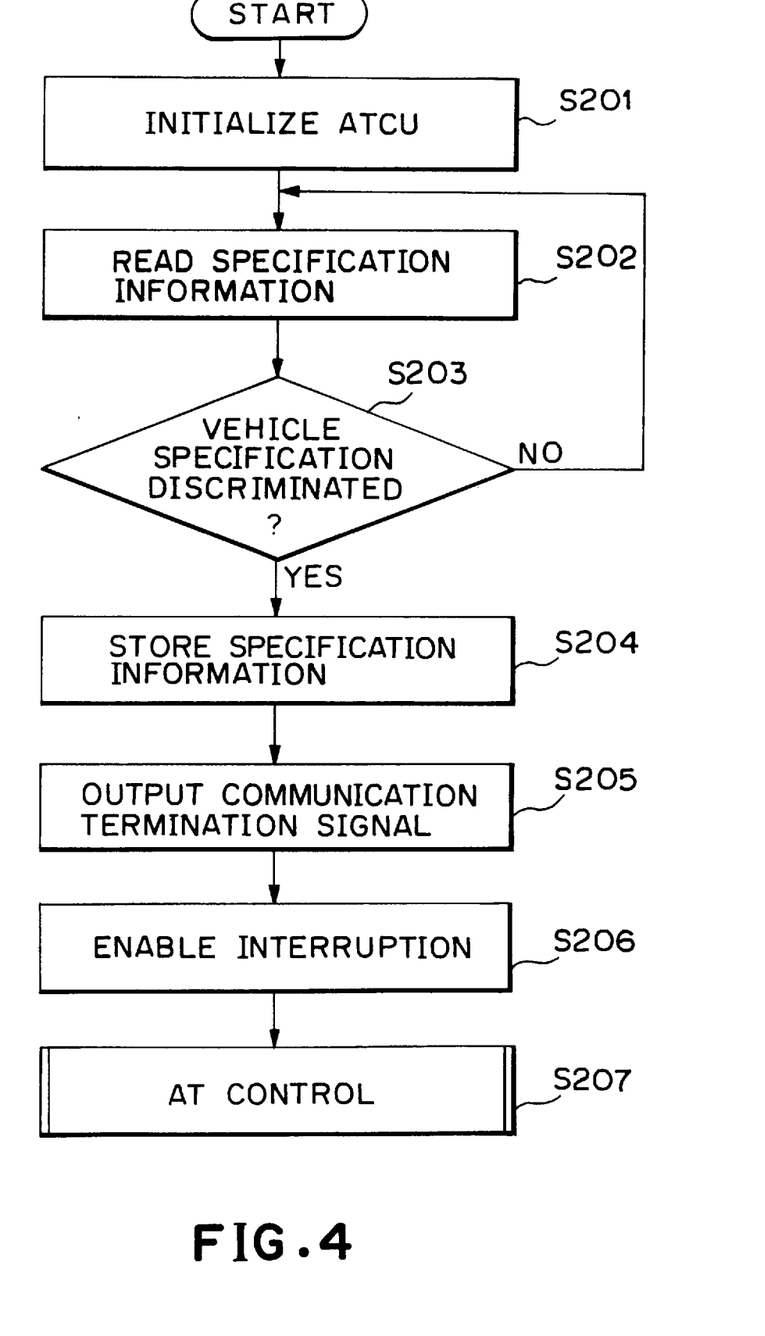
FIG. 4 is a flowchart for explaining operation of the control unit for the automatic transmission shown in FIG. 2.

In the shown embodiment, when power supply for the ECU 10 and the ATCU 20 is turned ON in response to turning ON of an ignition switch, the ECU 10 and the ATCU 20 initiates operations shown in FIGS. 3 and 4.

At the ECU 10 side, at step S101 of FIG. 3, initialization process of the engine control circuit is performed as in a normal microcomputer based electronic control circuit. In concrete terms, designation of operation mode of CPU, checking of presence or absence of abnormality of ROM, RAM as storage device, cleaning of storage content of RAM, and setting of initial values of CPU output port and/or RAM and so forth are performed. During this period, a trigger signal of an interruption process input to CPU is masked and thus interruption is inhibited.

Subsequently, at step S102, the foregoing specification information is output to the ATCU 20. At step S103, check is performed whether a signal indicative of reception of the specification information is transmitted from the ATCU 20. The specification information is continuously transmitted at step S102 until the signal is transmitted. When the signal is transmitted, masking of the trigger signal for interruption process is released at step S104.

Thereafter, at step S105, process of background job of engine control is executed. On the other hand, by interruption, per every event triggered regularly or in response to input of signal to an interruption triggering port of CPU, a interruption process routine (not shown) is executed.

On the other hand, in the ATCU 20, at step S201 of FIG. 4, initialization process of a control circuit for an automatic transmission (AT control circuit) is performed. During this period, a trigger signal of the interruption process input to CPU is masked to inhibit interruption. Subsequently, at step S202, the specification information transmitted from the ECU 10 is read out. Then, at step S203, check is performed whether the specification information is discriminated or not. Check at step S203 may also be checking of an end signal of the communication protocol. Reading process of the specification information is repeated until the specification information is discriminated. When the specification information is discriminated, the information is stored in RAM employed in the ATCU 20 as storage means.

Subsequently, at step S205, after outputting a communication termination signal indicative of completion of reading out of the specification information is output to the ECU 10, masking of interruption is released at step S206. At step S207, process of background job of the automatic transmission control is executed.

Figure 5:
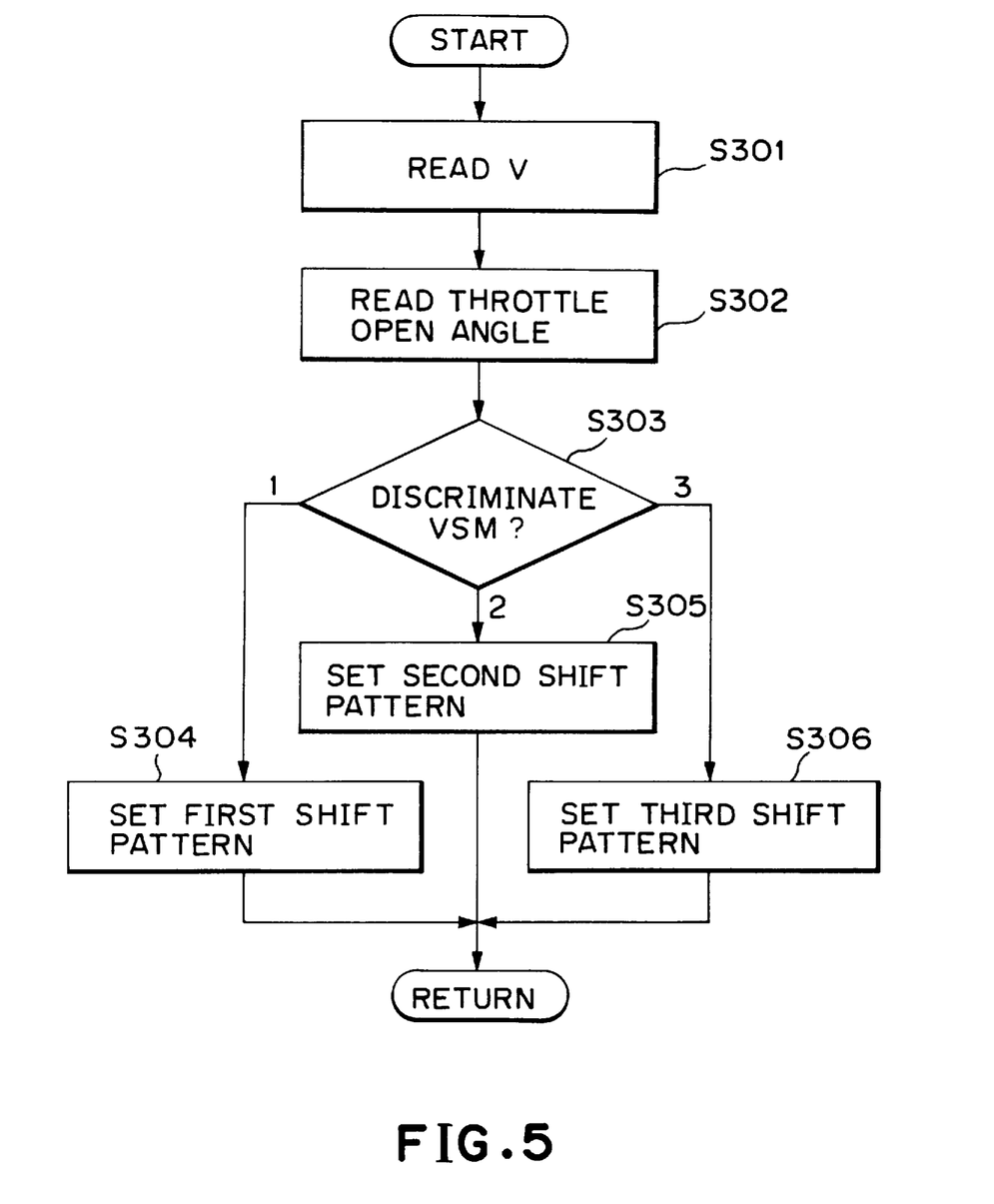
FIG. 5 is another flowchart for explaining operation of the control unit for the automatic transmission shown in FIG. 2.

The ATCU 20 sets the content of control shown in FIG. 5, on the basis of read out specification information from the ECU 10. Here, numerated one specification information is assumed as VSM, one of shifting patterns 1, 2 and 3 is set on the basis of the its value.

Namely, at steps S301 and S302 of FIG. 5, a vehicle speed V and a throttle valve open angle detected by the vehicle speed sensor 4 and the throttle angle sensor 3 are read. Then, at step S303, the value of the specification information VSM is discriminated. Then, depending upon those values, any one of the shift patterns 1, 2 and 3 is set at steps S304, S305 and S306. Accordingly, the ATCU 20 determines the transmission speed ratio depending upon the vehicular traveling condition and the vehicle condition on the basis of the shifting pattern corresponding to the vehicle speed V, the throttle valve open angle and the value of specification information VSM for controlling the automatic transmission 2.

As the specification information, kind of vehicle, destination for shipping, displacement of the engine 1 or combination thereof may be handled. On the other hand, on the basis of the specification information, a control constant of a line pressure upon shifting and so forth may be modified in addition to the shift pattern.

On the other hand, in case of the shown embodiment, the communication means for integrated control system of the ECU 10 and the ATCU 20 is effectively utilized as means for transmitting the specification information. On the other hand, when the same ATCU 20 is combined for a plurality of kinds of ECU 10, the ATCU 20 can have specification information of a plurality of kinds of ECUs 10 corresponding to kind of the engine 1, in common, it is not necessary to modify parts setting of the ATCU 20 depending upon the specification information per ECU 10 for preventing cost-up. In addition, by integrating content of storage of ROM in the ATCU 20 as the same ROM, lowering of cost by preparing the mask of ROM can be realized, and significant mass-production effect can be obtained. Furthermore, in order to make all of the ATCUs 20 as the same product, setting of the parts number as required conventionally becomes unnecessary to facilitate management to permit further cost-down.

On the other hand, as the recent tendency, the engine is controlled by electronic control system even in the vehicle mounting a mechanical automatic transmission or manual transmission, number of production of the ECU 10 of the same specification becomes large. In case of the ECU 10, establishing the mask of ROM of respective kinds of specification is easier than that of the ATCU 20. Accordingly, it will contribute for cost-down for the entire vehicle by loading specification information in the control unit produced in large number in one kind of vehicle, such as ECU 10 and by transmitting the specification information to the control unit produced in small number, such as the ATCU 20.

(Second Embodiment)

Figure 6:
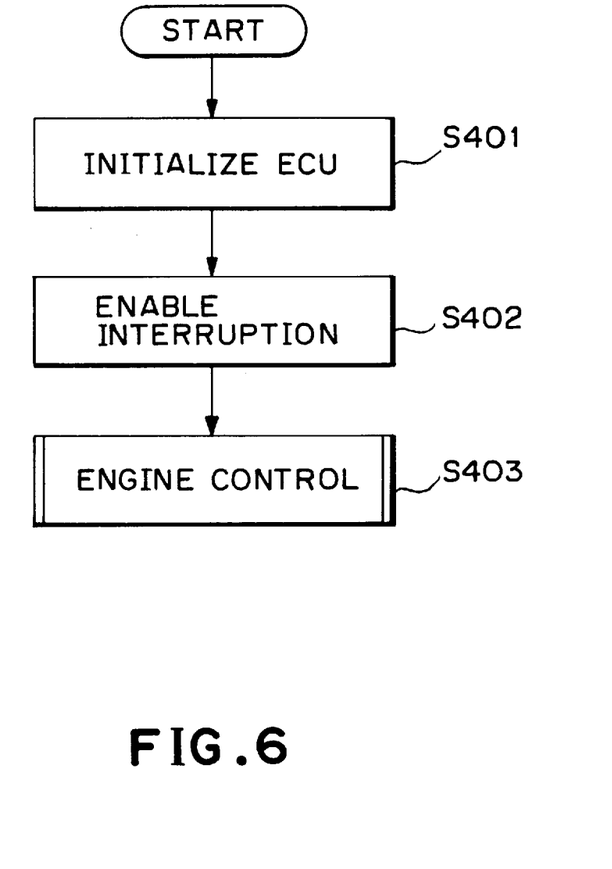
FIG. 6 is a flowchart for explaining operation of the control unit for the engine in the second embodiment of the electronic control system according to the present invention.
Figure 7:
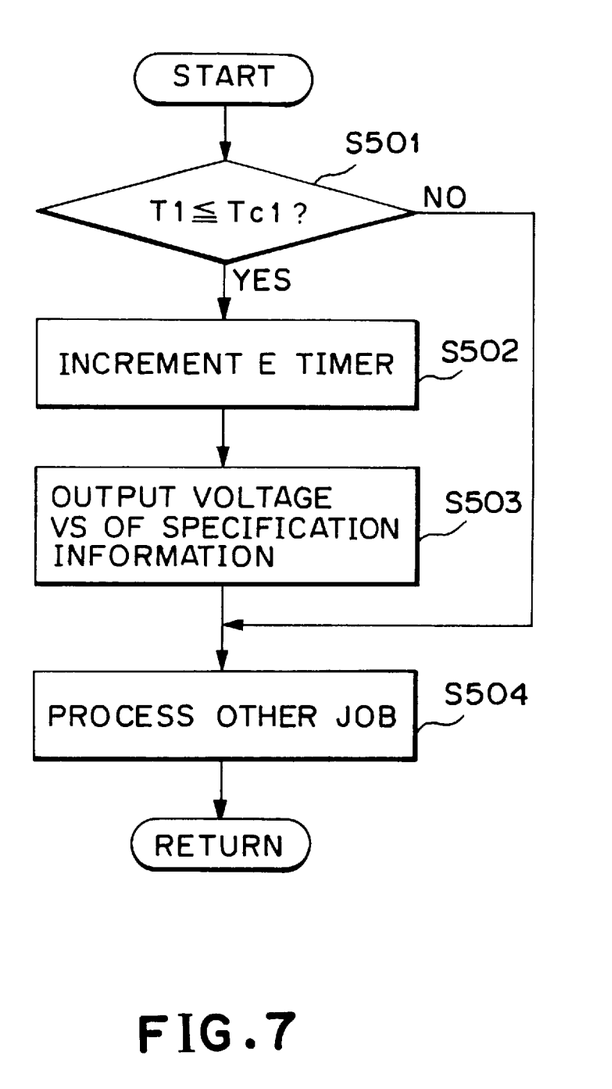
FIG. 7 is another flowchart for explaining operation of the control unit for the engine in the second embodiment of the electronic control system according to the present invention.
Figure 8:
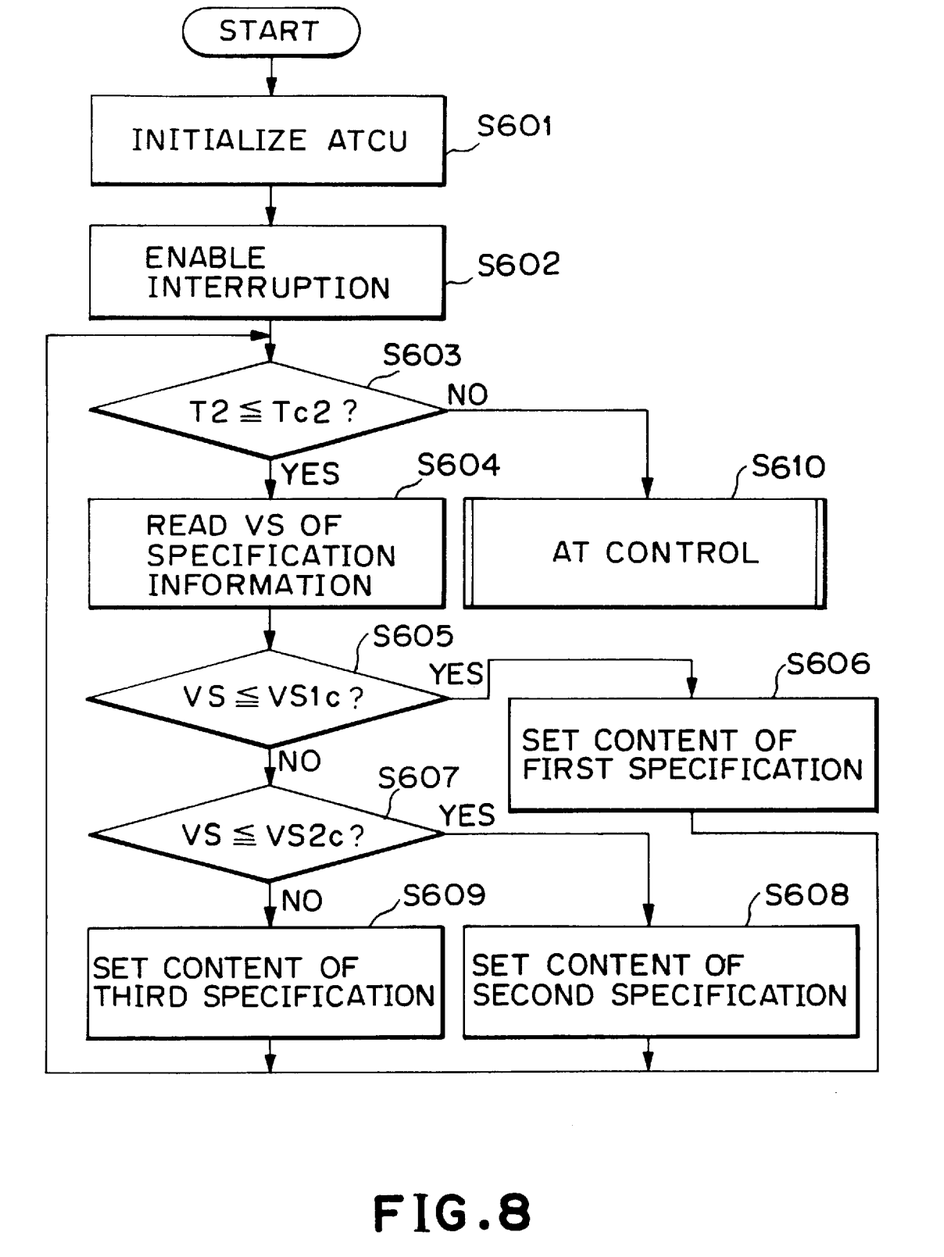
FIG. 8 is a flowchart for explaining operation of the control unit for the automatic transmission in the second embodiment of the electronic control system according to the invention.
Figure 9:
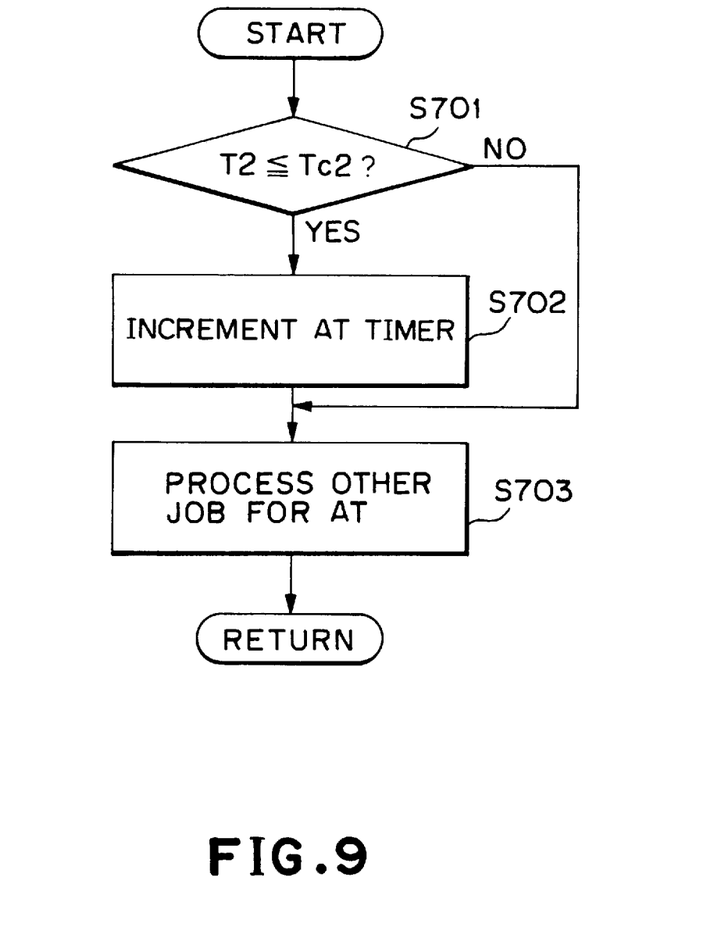
FIG. 9 is another flowchart for explaining operation of the control unit for the automatic transmission according to the second embodiment of the electronic control system according to the invention.

FIGS. 6 to 9 are drawings for explaining operation of the ECU 10 and the ATCU 20 in the second embodiment of the electronic control system according to the present invention. FIGS. 6 and 7 are explanatory illustrations of the operation of the ECU 10, and FIGS. 8 and 9 are explanatory illustrations of the operation of the ATCU 20. In the shown embodiment, as the communication means between the ECU 10 and the ATCU 20, an analog signal line is employed.

At first, in the ECU 10, steps S401, S402 and S403 of FIG. 6 are basically the same to the steps S101, S104 and S105 of FIG. 3 set forth above.

FIG. 7 is a routine to be processed regularly by the ECU 10. After converting the specification information into the analog signal by a D/A converter (not shown), the analog signal is transmitted to the ATCU 20. The routine of FIG. 7 cannot be started unless masking of interruption at the step 402 is released and is executed at every predetermined timing (every 10 msec. in the shown embodiment) after the timing of releasing.

At first, at step S501, an E timer for counting an elapsed period, is checked for making judgement that the specification information is transmitted to the ATCU 20 when a counted value T1 of the E timer exceeds a predetermined value Tc1. At step S504, other job relating to the engine control, which is required to be processed per every 10 msec. is processed. On the other hand, when the counted value T1 is less than or equal to the predetermined value Tc1, the counted value T1 of the E timer is incremented at step S502. Then, a voltage VS corresponding to the specification information is output at step S503. Accordingly, the ECU 10 transmits the specification information until a period elapsing the predetermined value Tc1 after first execution of the routine of FIG. 7, namely, a limited period upon starting-up of the engine.

The voltage Vs is set as following voltage depending upon the specification information when the specification information is to select one of three, first, second and third specifications.

The voltage VS corresponding to the first specification is set at $0 \leq VS \leq VS1c$, the voltage corresponding to the second specification is set at $Vs1c < VS \leq VS2c$, and the voltage VS corresponding to the third specification is set at $VS2c < VS \leq$ maximum voltage (normally 5V) ($0 < VS1c < VS2c < VS3c <$ maximum voltage).

A processing for resetting the E timer to "0" can be performed during a period, in which the process goes on from step S501 to S504. In such case the process becomes more complicated because checking of completion of transmission is required at the first timing of the routine of FIG. 7 since transmission of the specification information is limited to a starting time of the engine.

On the other hand, in the ATCU 20, steps S601 and S602 of FIG. 8, are basically the same as steps S201 and S206 in FIG. 4 set forth above. At step S603 of FIG. 8, check is performed whether the counted value T2 of AT timer which will be discussed later, is less than or equal to a predetermined value Tc2 or not. When the counted value T2 exceeds the predetermined value Tc2, judgement is made that the specification information is already read to execute the process of background job of the automatic transmission control. On the other hand, when the counted value T2 is less than or equal to the predetermined value Tc2, the voltage VS as the specification information is read from the ECU 10, at step S604. Then, at steps S605 and S607, judgement is made for the value of the voltage VS and the content of the first, second or third specification corresponding to the value of the voltage VS is set (steps S606, S608 and S609).

FIG. 9 is a routine processed regularly per every 10 msec. by the ATCU 20 to perform a process relating to the AT timer measuring the elapsed period. Namely, at step S701, check is performed whether the counted value Ts of the AT timer is less than or equal to the predetermined value Tc2 or not. If the counted value T2 exceeds the predetermined value Tc2, judgement is made that the specification information is already read. At step S703, process of other job relating to the automatic transmission control required to be processed per every 10 msec is performed. On the other hand, when the counted value T2 is less than or equal to the predetermined value Tc2, the counted value T2 of the AT timer is incremented at step S702. Accordingly, the ATCU 20 receives the specification information during a period until the period corresponding to the predetermined value Tc2 after first execution of the routine of FIG. 9, namely a limited period upon starting up of the engine. The value Tc2 is set at a value different from the value Tc1 in consideration of difference of period required for initialization of the automatic transmission control circuit and the electronic control circuit for the engine.

Although the invention has been illustrated and described with respect to exemplary embodiment thereof, it should be understood by those skilled in the art that the foregoing and various other changes, omissions and additions may be made therein and thereto, without departing from the spirit and scope of the present invention. Therefore, the present invention should not be understood as limited to the specific embodiment set out above but to include all possible embodiments which can be embodied within a scope encompassed and equivalents thereof with respect to the feature set out in the appended claims.

What is claimed is:

1. An electronic control system for an automotive vehicle comprising:

a first control unit;

a second control unit;

communication means provided between said first and second control units;

specification information presenting means arranged within said first control unit for presenting specification information to said second control unit via said communication means for a given period after initiation of operation of said first and second control units;

specification information analyzing means arranged within said second control unit for analyzing said specification information, said specification information analyzing means having a storage portion for storing the specification information presented by said specification information presenting means; and control content setting means arranged within said second control unit for setting content of control depending upon said specification information on the basis of a result of analysis by said specification information analyzing means.

2. An electronic control system for an automotive vehicle as claimed in claim 1, wherein said first control unit is an electronic control system for controlling an engine, said specification information presenting means presents at least one of vehicle type information, shipping destination information and engine type information, and said second control unit is an automatic transmission control unit for controlling an automatic transmission.

3. An electronic control system for an automotive vehicle as claimed in claim 1, wherein said control content setting means sets at least one of shift pattern of said automatic transmission and control content of a line pressure upon shifting.

4. An electronic control system for an automotive vehicle as claimed in claim 1, wherein said communication means has an analog signal line.

5. An electronic control system for an automotive vehicle as claimed in claim 1, wherein said communication means has a digital signal line.

6. An electronic control system for an automotive vehicle comprising:

a first control unit;

a second control unit;

communication means provided between said first and second control units;

specification information presenting means arranged within said first control unit for presenting specification information to said second control unit via said communication means;

specification information analyzing means arranged within said second control unit for analyzing said specification information; and control content setting means arranged within said second control unit for setting content of control depending upon said specification information on the basis of a result of analysis by said specification information analyzing means, wherein said communication means starts communication between said first and second control means when an ignition switch of the automotive vehicle is turned ON.

7. An electronic control system for an automotive vehicle comprising:

a first control unit;

a second control unit;

communication means provided between said first and second control units;

specification information presenting means arranged within said first control unit for presenting specification information to said second control unit via said communication means;

specification information analyzing means arranged within said second control unit for analyzing said specification information; and control content setting means arranged within said second control unit for setting content of control depending upon said specification information on the basis of a result of analysis by said specification information analyzing means, wherein said second control means has means for transmitting a communication termination signal to said first control means via said communication means when reading of said specification information presented from said first control means via said communication means is completed, and said first control means waits for said communication termination signal from said second control means for controlling a control object of said first control means.

8. An electronic control system for an automotive vehicle comprising:

a first control unit;

a second control unit;

communication means provided between said first and second control units;

specification information presenting means arranged within said first control unit for presenting specification information to said second control unit via said communication means;

specification information analyzing means arranged within said second control unit for analyzing said specification information; and control content setting means arranged within said second control unit for setting content of control depending upon said specification information on the basis of a result of analysis by said specification information analyzing means, wherein said specification information processing means presents said specification information to said second control means via said communication means for a given period after starting up of the engine of the automotive vehicle.

* * * * *